United States Patent [19]

Bespalko et al.

[11] Patent Number: 5,625,773
[45] Date of Patent: *Apr. 29, 1997

[54] METHOD OF ENCODING AND LINE BREAKING TEXT

[75] Inventors: Stephen J. Bespalko, Escondido; John Monahan, Los Angeles, both of Calif.

[73] Assignee: Xerox Corporation, Stamford, Conn.

[*] Notice: The term of this patent shall not extend beyond the expiration date of Pat. No. 5,244,038.

[21] Appl. No.: 327,344

[22] Filed: Oct. 21, 1994

Related U.S. Application Data

[63] Continuation of Ser. No. 150,329, Nov. 10, 1993, abandoned, which is a continuation of Ser. No. 702,349, May 15, 1991, abandoned, which is a continuation of Ser. No. 333,504, Apr. 5, 1989, abandoned.

[51] Int. Cl.$^6$ ............................ G06F 15/00; G06F 12/00
[52] U.S. Cl. ........................... 395/167; 364/DIG. 2; 364/926.7; 364/926.8; 364/943.2; 364/761; 364/792
[58] Field of Search .................. 364/DIG. 1, DIG. 2; 395/150, 146, 145, 144

[56] References Cited

U.S. PATENT DOCUMENTS

| | | | |
|---|---|---|---|
| 4,028,677 | 6/1977 | Rosenbaum | 340/172.5 |
| 4,092,729 | 5/1978 | Rosenbaum et al. | 364/900 |
| 4,181,972 | 1/1980 | Casey | 364/900 |
| 4,244,031 | 1/1981 | Izushima | 364/419 |
| 4,456,969 | 6/1984 | Herzik et al. | 364/419 |
| 4,574,363 | 3/1986 | Carlgren et al. | 364/419 |
| 4,672,539 | 6/1987 | Goertzel | 395/375 |
| 4,686,649 | 8/1987 | Rush | 364/419 |
| 4,880,321 | 11/1989 | Sasaki | 400/64 |
| 4,882,703 | 11/1989 | Nicolai | 364/900 |
| 4,974,195 | 11/1990 | Amari | 364/419 |
| 4,995,738 | 2/1991 | Shibaoka | 400/7 |
| 5,182,709 | 1/1993 | Makus | 364/419 |
| 5,193,147 | 3/1993 | Amari et al. | 395/145 |
| 5,224,038 | 6/1993 | Bespalko | 364/419 |

FOREIGN PATENT DOCUMENTS 0083393  9/1982  European Pat. Off. .

OTHER PUBLICATIONS

Lexicontext, A Dictionary-Based Text Processing System by John Francis Haverty, Oct. 26, 1971.
Copilot: A Multiple Process Approach to Interactive Programming Systems by Daniel Carr Swinehart, Jul., 1974.
James L Peterson, Computer Programs for Detecting and Correcting Spelling Errors, Dec. 1980, pp. 676–687. Communications of the ACM, vol. 23, Dec., 1980, No. 12, N.Y. J Orzech.

Primary Examiner—Thomas G. Black
Assistant Examiner—Jean R. Homere
Attorney, Agent, or Firm—Robert Cunha

[57] ABSTRACT

This invention is a method of representing the text in a document in a way that enables very fast text processing on digital computers. More specifically, each word of text is represented as a number (or token) that refers to an information packet describing the word's characteristics. Operations then process each token, rather than each character, to perform text processing functions. In addition to the compact nature of this representation, the performance of virtually all functions in a WYSIWYG editor which are dependent on line-breaking speed are improved.

5 Claims, 3 Drawing Sheets

METHOD OF ENCODING AND LINE BREAKING TEXT

This is a continuation, of application Ser. No. 08/150,329, filed Nov. 10, 1993, now abandoned, which is a continuation of Ser. No. 07/702,349 filed May 15, 1991, abandoned which is a continuation of application Ser. No. 333,504, now abandoned filed Apr. 5, 1989.

BACKGROUND OF THE INVENTION

In a typical word processing system each paragraph exists internally as one or more strings of characters, and must be broken into lines before it can be displayed or printed. For example, the typical line-breaking algorithm has a main inner loop which adds the width of the current character to the sum of the widths of previous characters, and compares the new total to the desired line width. The program will execute this loop until the number of characters in the line exceeds the number of characters that can be fit in the line. At this point, the program can either end the line with the last full word, or hyphenate the current word and put the word portion after the hyphen at the beginning of the next line.

Two problems with this process cause it to run too slowly: first, the inner loop must be executed for every character in the line; second, if hyphenation is enabled, the context of the character that overran the margin must be deduced—that is, a determination must be made whether the character is a space, punctuation mark, or part of a word. In general, all operations that require processing of each character such as pagination and scrolling through the document are very slow. In addition, operations that depend on the interpretation of the document as a sequence of words, such as hyphenation, spell-checking and search and replace are also very slow.

U.S. Pat. No. 4,181,972 (Casey) relates to a means and methods for automatic hyphenation of words and discloses a means responsive to the length of input words, rather than characters. However the Casey patent does not store the word length obtained for future use; at the time that hyphenation is requested, the Casey method scans the entire text character-by-character. The Casey patent also does not compute breakpoints based on the whole word length. Instead, Casey teaches the use of a memory-based table of valid breakpoints between consonant/vowel combinations.

U.S. Pat. Nos. 4,092,729 (Rosenbaum et al) and 4,028,677 (Rosenbaum) relate to methods of hyphenation also based on a memory table of breakpoints. Rosenbaum '729 accomplishes hyphenation based on word length (see claim 6), but the method disclosed is different than the invention disclosed here. In Rosenbaum '729, words are assembled from characters at the time hyphenation is requested, and then compared to a dictionary containing words with breakpoints. The invention disclosed here assembles the words at the time the document is encoded, and does not use a dictionary look-up technique while linebreaks are computed.

What is required is a better method of representing the text for document processing. A natural approach for reducing the computational intensity of the composition function would be to create data structures that would enable computation a word at a time rather than a character at a time. The internal representation of the text, in this case, is a token which is defined as the pair:

<type, data> where the type is a unique identifier for each class of token, and data is the data associated with a particular type of token. A token can be represented in a more compact way as <type, pointer> where the pointer is the address of the data associated with that token. This form of the token is more easily manipulated since entries are the same length. An even more compact representation of a token is achieved when the token type is included in the data block; this reduces the fundamental token object to a pointer. Since the type information is still present in the datablock, a pointer of this form is still appropriately referred to as a token. In the past, several approaches used an internal representation of text that was some form of token, and all had drawbacks that prevented them from being applied to rapid text composition.

Numerous prior systems have used tokens for editing computer programs. See, for example: Copilot: A Multiple Process Approach to Interactive Programming Systems, Daniel Charles Sweinhart, July 1974, phD Thesis, Stanford University. Swinehart uses tokens to maintain a relationship between the source code (text) and the corresponding parse tree that the compiler uses to translate the program into machine instructions. After each editing operation the lines of source code that changed are rescanned into tokens, the parse tree is rebuilt and finally, the parse tree is inspected for correctness. These systems are very popular for creating and modifying programs written in languages like Lisp, but tend to be fairly slow and laborious. The benefit to the user is that there is a greater likelihood that the changes made to a program will result in errors being removed rather than introduced.

A second known approach uses tokens as the fundamental text unit to represent English words rather than elements of a computer programming language. In Lexicontext: A Dictionary-Based Text Processing System, John Fransis Haverty, August 1971, masters thesis, Massachusetts Institute of Technology, a token points to a lexicon entry containing the text for the word; a hashing function is then used to retrieve the data associated with the entry which can be uniquely defined for each token. This encoding method is very general, but at the expense of performance.

Furthermore, since a principal application of Haverty's method is as a natural language interface to an operating system, the lexicon is global and thus independent of any particular document. This architecture is practical in an environment where the information is processed on a single central processor and when the entire universe of words that would be encountered is known in advance. Even if words could be added to the global lexicon, there would still be problems in a distributed environment where processors may not be connected to a network or other communications device. In this case, the lexicons would quickly diverge, and documents created on one machine could not be correctly interpreted on any other machine. Another major drawback of this approach is that if an error is detected in the main lexicon all of the documents encoded with the flawed lexicon would need to be reprocessed—if it was even possible to rebuild the documents. Because the main lexicon must by design be very large, it would be impractical to maintain the lexicon as resident in main memory. A large lexicon not resident in main memory would impose a tremendous performance penalty.

SUMMARY OF THE INVENTION

This invention is a method of using tokens to represent text in a way that is specifically designed for efficiently composing text. Rather than the tree-oriented structure that is used in the computer program editors, a simple linked list is used. The tokens point directly to the data associated with the token thus eliminating the hashing function and, although the data blocks are of variable length, the data blocks are uniformly defined for all tokens. The dictionaries are local to each document, leading to a system that is well suited to distributed environments.

The technique could be applied to a document composition system to speed up line-breaking. The method is particularly efficient when hyphenated text is desired. Performance does not degrade when the algorithms are extended to support ligatures, kerned pairs and foreign text. This technique is extremely well suited to German text, which is more likely to contain long words, hyphenations, spelling changes which result from hyphenations, and words that must be hyphenated more than once.

The method consists of parsing the text in a document into a sequence of "atoms" which can be words, punctuation marks or spaces, and assigning a number (a "token") to each one. As an example, if the program assigns the token "301" to the atom "of" the first time that word is encountered, then it will continue to assign the same number "301" to every other "of" in the document.

A table of properties is also constructed for each unique token in the document. The following is a list of the properties maintained for atoms other than spaces:

text: the characters in the atom lastFont: a code representing the display characteristics of the font used to compute the token properties cached in this table notPunctuation: a Boolean indicating whether the atom is a punctuation mark atomMetrics: a record containing the character count of the token and the width of the word in screen and printer units. This information is derived from the font referred to by lastFont.

breakPoints: An array with one entry for each break point in the token. If the entry is a hyphenation point, the entry contains metric information for the portion of the word prior to the hyphenation point, including the width of the hyphen. If the hyphen is a hard hyphenation point inserted by the user then the width of the hyphen is not included. The token corresponding to a space is handled differently from other tokens. It does not have a set of properties associated with it since the rules for treating it are much different from those of other tokens.

A text processing function can proceed by using each successive token to access the current token properties. This greatly speeds up the algorithms that classically process the document a character at a time, as well as the text functions that interpret the document as a sequence of atoms.

The line-breaking algorithm can use each successive token to access the metric information in the token properties. If the line width has been exceeded, the current line will usually be terminated at the previous token. If the text is to be right justified, the interword spacing can be stretched. Finally, if the line cannot be stretched far enough, the token corresponding to the overset token will be examined to determine if it can be hyphenated.

This process, which is based on computing the line-endings on a token-by-token basis, can be compared to the prior method of line-breaking on a character-by-character basis. Previously, text was represented as a string comprised of a character code, such as ASCII, for each letter. The running sum of character widths for the line was computed by looking each succesive character up in a table of character metrics which included the character width. In contrast, this invention uses a data structure comprising an array with a token for each atom, and a list of token properties, including the token width. The token width is used to generate a running sum of widths for each line. The main difference between the character-by-character and token-by-token method is that the inner loop of the latter method is executed approximately once for each word (token) rather than once for each character, which allows the program to run faster. Furthermore, with the character-by-character method, when hyphenation is desired, the context of the character that overruns the margin (ie. whether it is a part of a word or punctuation mark) must be determined each time the text is repaginated. With the token model this information is retained as part of the token properties. In a WYSIWYG editor where the portion of the text on the current page may be repaginated as often as after each keystroke, this is an immense advantage.

DETAILED DESCRIPTION OF THE INVENTION

Encoding text using this method consists of parsing the document into atoms and building arrays of tokens that correspond to the atoms. A small number of entries in the arrays are not tokens. These are special entries that are required for encoding infrequent sequences of characters (like consecutive spaces) and for encoding very large documents.

TABLE 1

```
DIRECTORY
    TokenProps USING[Offset];
Token: DEFINITIONS = BEGIN
EntryType: TYPE = MACHINE DEPENDENT {token(0), escape(1)};
EscapeType: TYPE = MACHINE DEPENDENT {space(0), zeroWidthSpace(1), changeBase(2)};
ThirteenBits: TYPE = [0 . . . 8191];
Entry: TYPE = MACHINE DEPENDENT RECORD [
    SELECT entryType: EntryType FROM
        token = >
            [spaceFollows: BOOLEAN,
            offset: TokenProps.Offset],
        escape = >
            [SELECT escapeType: EscapeType FROM
```

TABLE 1-continued

```
        changeBase = > [newBase: ThirteenBits],
        space = > [ ],
        zeroWidthSpace = > [ ],
      ENDCASE],
  ENDCASE];
EncodedText: TYPE = LONG DESCRIPTOR FOR ARRAY CARDINAL OF Entry;
END.
```

The text in Table 1 consists of the type definitions for the data structures needed to encode text into tokens. The computer language used in Table 1 is Mesa [The Xerox Development Environment Mesa Language Manual, Xerox Corporation, 1985]. Mesa is similar to Pascal [Pascal User Manual and Report, Katheleen Jensen and Niklaus Wirth, Springer-Verlag, 1974] and Modula II [Programming in Modula-II, Niklaus Wirth, Springer-Verlag, 1982]. The directory clause declares that the type Offset from the interface Token is used in LineBreak.mesa. Next, the file is declared as a DEFINITIONS file since the function of the file is to define data-types and procedures.

The data structure defining the encoded array of tokens is EncodedText. Each element in the array is an Entry. Each Entry in the encoded text fits in one word of memory. The Entry is a record that has two variants: a token or an escape.

The token variant consists of two fields: the number corresponding to the atom the token refers to, and a Boolean indicating whether or not a space follows the token. To maximize the performance, the token assigned to each atom is chosen in such a way as to allow it to be used to determine the location in memory of the properties for that token.

The escape variant of the Entry record is itself a variant record. This variant is used to encode information that cannot be represented with token entries.

The changeBase escape variant is required to encode large documents. Since the offset in the token variant consists of only 14 bits, the number of tokens that can be directly addressed is limited. The changeBase escape allows the address space for token properties to be changed, and thus allows a very large number of token properties to be addressed.

The space escape variant is used to represent consecutive spaces. This is needed because the token entry can only encode whether a single space is following an atom. The space variant has no parameters.

The zeroWidthSpace escape variant is used to represent a nonhyphenating break point in an atom. This is a seldom-used feature in the XICS markup language [Xerox Integrated Composition System User Guide, Xerox Corporation, 1987]. The zeroWidthSpace variant has no parameters.

TABLE 2

```
[escape[changeBase[newBase:1]]],
[token [spaceFollows:TRUE, offset:    1]],    The☐
[token [spaceFollows:TRUE, offset:   20]],    approach☐
[token [spaceFollows:TRUE, offset:   44]],    used☐
[token [spaceFollows:TRUE, offset:   63]],    here☐
[token [spaceFollows:TRUE, offset:   82]],    is☐
[token [spaceFollows:TRUE, offset:  101]],    to☐
[token [spaceFollows:TRUE, offset:  120]],    encode☐
[token [spaceFollows:TRUE, offset:  141]],    the☐
[token [spaceFollows:TRUE, offset:  160]],    entire☐
[token [spaceFollows:TRUE, offset:  184]],    document☐
[token [spaceFollows:TRUE, offset:  211]],    as☐
```

TABLE 2-continued

```
[token [spaceFollows:TRUE, offset:  230]],    a☐
[token [spaceFollows:TRUE, offset:  256]],    sequence☐
[token [spaceFollows:TRUE, offset:  280]],    of☐
[token [spaceFollows:TRUE, offset:  299]],    tokens☐
[token [spaceFollows:FALSE, offset: 323]],    (
[token [spaceFollows:TRUE, offset:  342]],    or☐
[token [spaceFollows:FALSE, offset: 361]],    numbers
[token [spaceFollows:TRUE, offset:  385]],    )☐
[token [spaceFollows:TRUE, offset:  404]],    where☐
[token [spaceFollows:TRUE, offset:  425]],    each☐
[token [spaceFollows:TRUE, offset:  444]],    unique☐
[token [spaceFollows:TRUE, offset:  465]],    punctuation☐
[token [spaceFollows:FALSE, offset: 512]],    mark
[token [spaceFollows:TRUE, offset:  531]],    ,☐
[token [spaceFollows:FALSE, offset: 550]],    space
[token [spaceFollows:TRUE, offset:  531]],    ,☐
[token [spaceFollows:TRUE, offset:  342]],    or☐
[token [spaceFollows:TRUE, offset:  256]],    sequence☐
[token [spaceFollows:TRUE, offset:  280]],    of☐
[token [spaceFollows:TRUE, offset:  571]],    contiguous☐
[token [spaceFollows:TRUE, offset:  600]],    characters☐
[token [spaceFollows:TRUE, offset:  629]],    separated☐
[token [spaceFollows:TRUE, offset:  661]],    by☐
[token [spaceFollows:TRUE, offset:  230]],    a☐
[token [spaceFollows:TRUE, offset:  550]],    space☐
[token [spaceFollows:TRUE, offset:  342]],    or☐
[token [spaceFollows:TRUE, offset:  465]],    punctuation☐
[token [spaceFollows:TRUE, offset:  512]],    mark☐
[token [spaceFollows:TRUE, offset:   82]],    is☐
[token [spaceFollows:TRUE, offset:  680]],    identified☐
[token [spaceFollows:TRUE, offset:  709]],    with☐
[token [spaceFollows:TRUE, offset:  230]],    a☐
[token [spaceFollows:TRUE, offset:  444]],    unique☐
[token [spaceFollows:FALSE, offset: 728]],    token
[token [spaceFollows:TRUE, offset:  768]],    .☐
[token [spaceFollows:TRUE, offset:  787]],    During☐
[token [spaceFollows:TRUE, offset:  811]],    an☐
[token [spaceFollows:TRUE, offset:  830]],    editing☐
[token [spaceFollows:TRUE, offset:  854]],    session☐
[token [spaceFollows:TRUE, offset:  230]],    a☐
[token [spaceFollows:TRUE, offset:  878]],    table☐
[token [spaceFollows:TRUE, offset:   82]],    is☐
[token [spaceFollows:TRUE, offset:  902]],    constructed☐
[token [spaceFollows:TRUE, offset:  709]],    with☐
[token [spaceFollows:TRUE, offset:  230]],    a☐
[token [spaceFollows:TRUE, offset:  931]],    set☐
[token [spaceFollows:TRUE, offset:  280]],    of☐
[token [spaceFollows:TRUE, offset:  950]],    properties☐
[token [spaceFollows:TRUE, offset:  979]],    for☐
[token [spaceFollows:TRUE, offset:  425]],    each☐
[token [spaceFollows:FALSE, offset: 728]],    token
[token [spaceFollows:TRUE, offset:  768]],    .☐
[token [spaceFollows:TRUE, offset:  998]],    Token☐
[token [spaceFollows:TRUE, offset:  950]],    properties☐
[token [spaceFollows:TRUE, offset:1024]],     include☐
[token [spaceFollows:TRUE, offset: 141]],     the☐
[token [spaceFollows:TRUE, offset:1048]],     last☐
[token [spaceFollows:TRUE, offset:1067]],     font☐
[token [spaceFollows:TRUE, offset: 141]],     the☐
[token [spaceFollows:TRUE, offset: 728]],     token☐
[token [spaceFollows:TRUE, offset:1086]],     was☐
[token [spaceFollows:FALSE, offset:1105]],    encountered
[token [spaceFollows:TRUE, offset: 531]],     ,☐
[token [spaceFollows:TRUE, offset: 141]],     the☐
[token [spaceFollows:TRUE, offset:1134]],     type☐
```

TABLE 2-continued

| | |
|---|---|
| [token [spaceFollows:TRUE, offset: 280]], | of□ |
| [token [spaceFollows:FALSE, offset: 728]], | token |
| [token [spaceFollows:TRUE, offset: 531]], | ,□ |
| [token [spaceFollows:TRUE, offset:1153]], | as□ |
| [token [spaceFollows:TRUE, offset:1172]], | well□ |
| [token [spaceFollows:TRUE, offset:1153]], | as□ |
| [token [spaceFollows:TRUE, offset:1191]], | metric□ |
| [token [spaceFollows:TRUE, offset:1251]], | information□ |
| [token [spaceFollows:TRUE, offset: 979]], | for□ |
| [token [spaceFollows:TRUE, offset: 141]], | the□ |
| [token [spaceFollows:TRUE, offset: 160]], | entire□ |
| [token [spaceFollows:TRUE, offset:1247]], | word□ |
| [token [spaceFollows:TRUE, offset:1280]], | and□ |
| [token [spaceFollows:TRUE, offset: 425]], | each□ |
| [token [spaceFollows:TRUE, offset:1299]], | hyphenation□ |
| [token [spaceFollows:FALSE, offset:1328]], | point |
| [token [spaceFollows:TRUE, offset: 768]], | .□ |
| [token [spaceFollows:TRUE, offset:1349]], | To |
| [escape[space[ ]]], | □ |
| [token [spaceFollows:TRUE, offset:1368]], | demonstrate□ |
| [escape[space[ ]]], | □ |
| [token [spaceFollows:TRUE, offset: 141]], | the□ |
| [escape[space[ ]]], | □ |
| [token [spaceFollows:TRUE, offset:1397]], | use□ |
| [escape[space[ ]]], | □ |
| [token [spaceFollows:TRUE, offset: 280]], | of□ |
| [escape[space[ ]]], | □ |
| [token [spaceFollows:TRUE, offset:1416]], | escape□ |
| [escape[space[ ]]], | □ |
| [token [spaceFollows:TRUE, offset:1440]], | entries□ |
| [escape[space[ ]]], | □ |
| [token [spaceFollows:TRUE, offset: 425]], | each□ |
| [escape[space[ ]]], | □ |
| [token [spaceFollows:TRUE, offset: 280]], | of□ |
| [escape[space[ ]]], | □ |
| [token [spaceFollows:TRUE, offset: 141]], | the□ |
| [escape[space[ ]]], | □ |
| [token [spaceFollows:TRUE, offset:1464]], | words□ |
| [escape[space[ ]]], | □ |
| [token [spaceFollows:TRUE, offset:1485]], | in□ |
| [escape[space[ ]]], | □ |
| [token [spaceFollows:TRUE, offset:1504]], | this□ |
| [escape[space[ ]]], | □ |
| [token [spaceFollows:TRUE, offset:1536]], | sentence□ |
| [escape[space[ ]]], | □ |
| [token [spaceFollows:TRUE, offset:1560]], | will□ |
| [escape[space[ ]]], | □ |
| [token [spaceFollows:TRUE, offset:1579]], | be□ |
| [escape[space[ ]]], | □ |
| [token [spaceFollows:TRUE, offset: 629]], | separated□ |
| [escape[space[ ]]], | □ |
| [token [spaceFollows:TRUE, offset: 661]], | by□ |
| [escape[space[ ]]], | □ |
| [token [spaceFollows:TRUE, offset:1598]], | two□ |
| [escape[space[ ]]], | □ |
| [token [spaceFollows:FALSE, offset:1617]], | spaces |
| [token [spaceFollows:FALSE, offset: 768]], | . |

TABLE 4

The approach used here is to encode the entire document as a sequence of tokens (or numbers) where each unique punctuation mark, space, or sequence of contiguous characters separated by a space or punctuation mark is identified with a unique token. During an editing session a table in constructed with a set of properties for each token. Token properties include the last font the token was encountered, the type of token, as well as metric information for the entire word and each hyphenation point. To demonstrate the use of escape entries each of the words in this sentence will be separated by two spaces.

Table 2 is the list of tokens that would be created from the text of Table 4. The table consists of the contents of each entry of the encoded text, one entry per row of the table. For the sake of clarity, the text for each token is included immediately to the right of each token Entry in Table 2. The first row of Table 2 contains an escape Entry that is a changeBase variant. It sets the address space for the token properties to the first address space. The address of the token properties is computed by combining the base address defined in the changeBase entry and the offsets in the token entries. The second row of the table contains a token variant entry. There are two items for each atom: a number identifying the atom, and a bit indicating whether there is a space after the atom. In this coding scheme, the space between atoms is part of the preceeding atom. For example, the first word "The" is assigned the values

[spaceFollows: TRUE, offset: 1].

Similarly, the second word, "approach" is

[spaceFollows: TRUE, offset: 20].

The ninth entry is the word "the" again, but with a lower case "t". This atom can not be given the same token as the original "The" which had a capital "T" because the widths of the characters will not usually be the same. The seventeenth entry is a left parenthesis. It is coded as

[spaceFollows: FALSE, offset: 323].

The 29th item on the list, the word "or" is the same word as the 18th word on the list. They will have identical properties and will therefore use the same token. Likewise, the commas of entries 26 and 28 will have the same tokens.

TABLE 3

```
DIRECTORY Environment;
TokenProps: DEFINITIONS = BEGIN
  BreakType:         TYPE = MACHINE DEPENDENT
         {hard(0), discretionary(1), best(2), better(3), good(4), ok(5), specialGermanCase(255)};
  lastPropsOffset:   PRIVATE CARDINAL = 16384;
  Base:              TYPE = LONG BASE POINTER TO Object;
  Offset:            TYPE = Base RELATIVE POINTER[0 . . . lastPropsOffset]TO Object;
  Handle:            TYPE = LONG POINTER TO Object;
  TrailerHandle:     TYPE = LONG POINTER TO ObjectTrailer;
  maxPages:          CARDINAL = lastPropsOffset/Environment.wordsPerPage;
  Object:            TYPE = MACHINE DEPENDENT RECORD [
    notPunctuation(0:0 . . . 0):   BOOLEAN,
```

TABLE 3-continued

```
    font(0:1 ... 15):           FontATOM,
    atomMetrics(1):             AtomMetrics,
    breakPointCount(4):         CARDINAL,
    breakPoint(5):              SEQUENCE COMPUTED CARDINAL OF BreakPointData];
Object Trailer:         TYPE = MACHINE DEPENDENT RECORD [
    referenceCount:             CARDINAL,
    text:                       PACKED SEQUENCE COMPUTED CARDINAL OF Environment.Byte];
AtomMetrics:            TYPE = MACHINE DEPENDENT RECORD [
    micaLength(0):              NATURAL,
    pixelLength(1):             NATURAL,
    byteCount(2):               NATURAL];
BreakPointData:         TYPE = MACHINE DEPENDENT RECORD [
    type(0:0 ... 7):            BreakType,
    byteCount(0:8 ... 15):      Environment.Byte,
    micaLength(1):              NATURAL,
    pixelLength(2):             NATURAL];
FontATOM;               TYPE = NATURAL;
END
```

Each token has an associated list of properties, as shown in Table 3. The set of properties is made up of two records: the TokenProps.Object and an instance of the record TokenProps.Trailer. Both of these records are declared as MACHINE DEPENDENT to force the Mesa compiler to pack the fields into as few words of memory as possible. By ordering the values in terms of decreasing frequency of access, the number of memory references needed to access the token properties could be minimized. Since in the Mesa programming lanugage indeterminate length arrays can only be located at the end of a record, two records were required to achieve the optimal order.

The first field in the Object record is a Boolean which indicates whether the atom is a punctuation mark. This field is used during line-breaking computations to determine where legal breaks can occur.

Next is a number identifying the style, size, stress and weight of the font. This number represents the last font from which the values of the atomMetrics, breakPoint array (if present) and the display bitmap were computed. Thus if the current font in which the atom is being processed is the same as the last font in which the atom was processed, the values in the property records are simply accessed and not recomputed, since the values are still correct. Otherwise, the values in the property records must be recomputed prior to processing the current token.

The third field is called the AtomMetrics and is also defined in the TokenProps interface. This record contains the metric information for the entire atom. The values in the AtomMetrics record are the length of the atom in micas (a machine independent unit defined as 1/2540th of an inch) and pixels (screen units) and the length of the atom text in bytes. English text would typically require one byte for each character, but more bytes per character may be required in another language or for representing special technical symbols. See The Xerox Character Code Standard [The Xerox Character Code Standard, Xerox Corporation, 1986] for a method of encoding international characters and special symbols that would require more than one byte per character.

Figure 1:
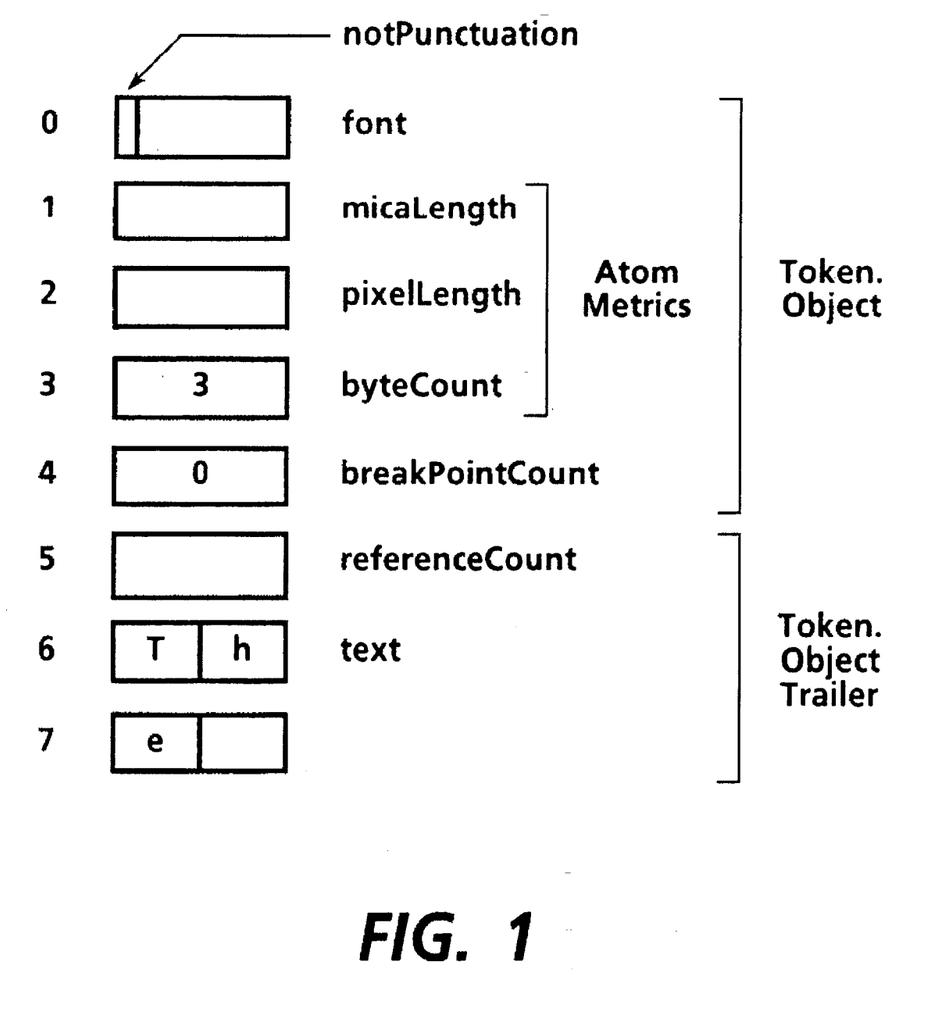
FIG. 1 is the memory layout for the token properties defined in TABLE 3 for a token that has no break points.
Figure 2:
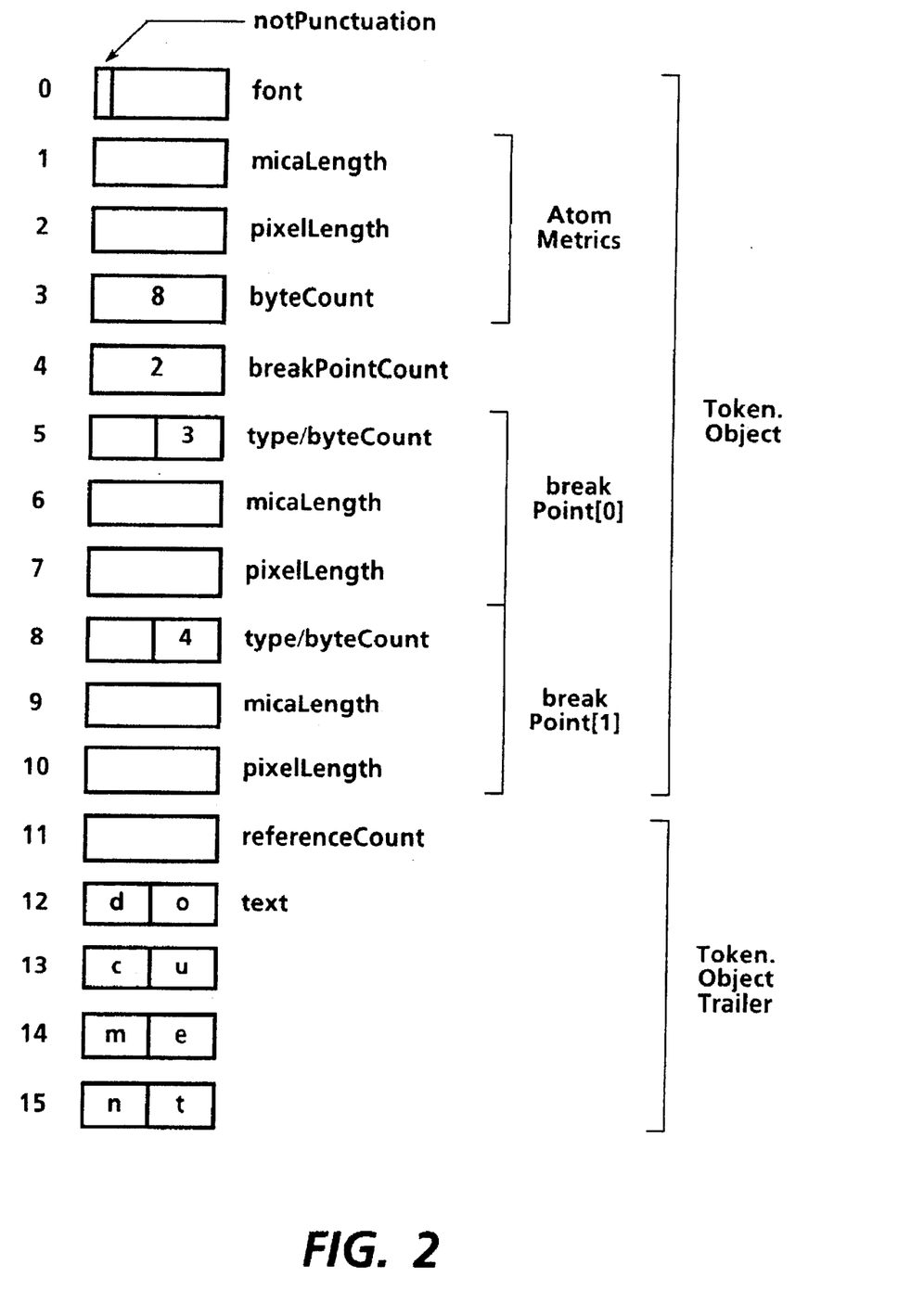
FIG. 2 is the memory layout of the token properties defined in TABLE 3 for a token that has two break points.
Figure 3:
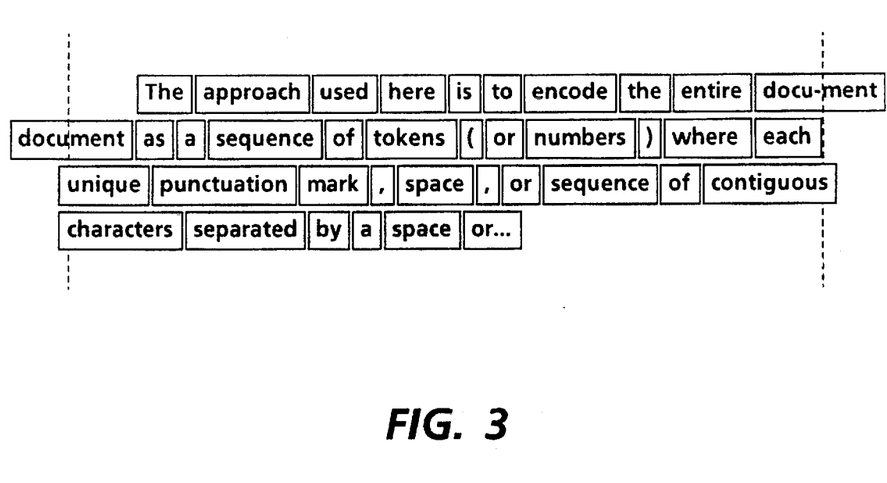
FIG. 3 is a diagram of the parameters defining the display bitmap portion of the data structures in TABLE 4.

Following the atomMetrics is the breakPointCount, which corresponds to the number of places an atom can be broken between lines. Break points are usually determined by hyphenating a word. A word may also include manually inserted zero-width spaces. In this encoding technique, the atom "the" has no break points. The last field in the Object is the breakPoint array. This array may be omitted altogether if there are no break points in the atom. FIG. 1 shows the memory layout of the properties for the atom "the". If there are break points in the atom, each element of the breakPoint array will consist of the first parts of the divided words that can be formed by hyphenating the original word. For example, the three-syllable word "document" will have two break points: information to describe "doc-" and "docu-". This is shown in FIG. 2.

The first element in each breakPoint array entry consists of the break point type, which is a parameter representing how desirable the break point is. This is used by the line-breaking algorithm. The byte count is the byte count of each alternative. Length is the length of each alternative in machine independent units and in pixels.

The second record describing the properties is the ObjectTrailer record. The trailer record is always present in the token properties.

The first field in the ObjectTrailer is the referenceCount. This is used by the editor's dynamic memory manager to determine when to free the space for a set of properties. Typically this is done when the reference count reaches zero.

The second field of the Trailer record is text. This is an array containing the characters in the token. The array length is stored in the AtomMetrics, defined above. To optimize searching for tokens, the number of bytes allocated for the text field may actually exceed the number of characters in the token. The number of characters allocated will usually be a multiple of two or four, depending on the particular machine the algorithm is implemented on.

TABLE 5

```
DIRECTORY
    Environment        USING[Byte],
    ESCAlphaExtras     USING[aLINEBREAK],
    inline             USING[DBITAND],
    Mopcodes           USING[zESC],
    Token              USING[EncodedText,],
    TokenProps         USING[Base, FontATOM];
LineBreak:    DEFINITIONS
              IMPORTS inline = BEGIN
SuffixChar:      TYPE = MACHINE DEPENDENT {space(0), zeroWidthSpace(1), hyphen(2),
hardHyphen(3), null(4)};
Reason:          TYPE = MACHINE DEPENDENT
                 {margin(0), normal(1), changeBase(2), invalidProps(3),
                 contiguousWords(4), unableToBreak(5), specialGermanCase(6)};
TwelveBits:   TYPE = [0 ... 4095];
ArgRec: TYPE = MACHINE DEPENDENT RECORD [
    text(0):                          Token.EncodedText,
    propsBase(3):                     TokenProps.Base,
    hyphenate(5:0 ... 0):             BOOLEAN,
    font(5: 1 ... 15):                TokenProps.FontATOM,
    margin(6):                        NATURAL,
    hyphenPixelLength(7:0 ... 7):     Environment.Byte,
    minSpacePixelLength(7:8 ... 15):  Environment.Byte,
    hyphenMicaLength(8):              NATURAL,
    minSpaceMicaLength(9):            NATURAL,
    whiteSpace(10):                   NATURAL,
    final(11):                        State,
    prior(17):                        State];
ArgHandle: TYPE = LONG POINTER TO ArgRec;
ArgSpace: TYPE = ARRAY[1 ... SIZE[ArgRec] + argAlignment)OF UNSPECIFIED;
argAlignment: PRIVATE CARBINAL = 32;
State: TYPE = MACHINE DEPENDENT RECORD
           [index(0);                 CARDINAL,
            micaLength(1):            INTEGER,
            pixelLength(2):           INTEGER,
            count(3:0 ... 11):        TwelveBits,
            notPunctuation(3:12 ... 12): BOOLEAN,
            suffixChar(3:13 ... 15):  SuffixChar,
            byteCount(4):             INTEGER,
            whiteSpace(5):            NATURAL];
AlignArgRec:PROCEDURE[lp: LONG POINTER TO ArgSpace]
        RETURNS [ArgHandle] = INLINE
        {RETURN[inline.DBITAND[lp + argAlignment - 1, 0FFFFFFE0H]]};
SoftwareLineBreak: PROCEDURE[arg: ArgHandle]
           RETURNS [reason: Reason];
LineBreak: PROCEDURE[arg: ArgHandle]
        RETURNS [reason: Reason] = MACHINE CODE
        {Mopcodes,zESC, ESCAlphaExtras.aLINEBREAK};
END.
```

Table 5 is the Mesa source code which defines the data and procedures for computing line breaks. The directory portion of the file defines the elements of other interface files that are referenced in LineBreak.mesa. LineBreak.mesa is declared as a DEFINITIONS file since the function of the file is to define data-types and procedures.

SuffixChar is a type that defines possible final characters that can appear at the end of a line of text. This is required for the display algorithm. SuffixChar is declared as machine dependent to ensure that the values assigned to each element in the enumerated type are consecutive and begin with 0.

Reason is an enumerated type that lists the possible reasons that the line-breaking algorithm can return. Reason is also machine dependent since the line-breaking algorithm depends on the particular values the compiler assigns to each element in the enumerated type. The following table defines each of the values of Reason:

margin the current token has exhausted the line measure and a line-breaking decision has been made. This means that a line break was identified that satisfied all of the constraints placed on the algorithm.

normal the current block of text has been exhausted with no line-breaking decision being made.

changeBase the current token is a changeBase escape invalidProps the properties for the current token are out of date and need to be recomputed with the current font contiguousWords the current token is not preceded by a space or punctuation mark. This usually implies that the two tokens are fragments of a single word. This result enables the client code to adjust the metric information for kerning and letterspacing, as well as to keep track of the beginning of the fragmented token in case a sequence of token fragments needs to be hyphenated.

unableToBreak a line-breaking decision could not be made even though the current line measure has been reached. The most common event that causes this result is that the token that overruns the margin is a punctuation mark.

specialGermanCase this reason is returned when the line-breaking algorithm attempts to break a token that requires respelling at the desired hyphenation point.

TwelveBits is a type that defines a twelve-bit unsigned integer. It is used in the StateRec record that is described below.

ArgRec is a machine dependent record which is the argument to the line-breaking algorithm. It is machine dependent because, where possible, several fields in the record are packed into a single word of memory.

The first field in the record is called text, which is a descriptor representing the array of tokens to be processed. The descriptor occupies three words of memory, with the first two words consisting of a pointer to the first token and the final word defining the length of the array.

The field propsBase is the base address used to resolve the relative pointers embedded in the token entries of the encodedText array. See Table 2 for an example of an encoded text passage. After the propsBase is a boolean called hyphenate. If hyphenate is TRUE then the line-breaking algorithm will attempt to hyphenate the token that crosses the line measure; otherwise the algorithm backs up to the last complete token that fit in the measure. The next field represents the style, size, stress and weight of the font being processed. If the font field in the ArgRec does not match one of the font fields in the tokenProps, then the algorithm returns with a reason of invalidProps. The field after font is the margin, which is the line measure in micas.

The next two fields in the ArgRec are the hyphenPixelLength and the minSpacePixelLength. These, respectively, define the width a hyphen and the minimum width a space can be in screen units (pixels). The next two fields are the width of a hyphen and the minimum width of a space in micas.

The whiteSpace field defines the maximum size of a space in micas. It is not neccessary to also define the maximum size of a space in pixels, because only the mica measure is used in making a line-breaking decision.

The final two fields in the ArgRec are called final and prior. Both of these are instances of the LineBreak.State record. These fields will be referred to in Mesa notaion as arg.final and arg.prior, respectively. These values in these records are used by the line-breaking algorithm for temporary storage and to record the result when a line-breaking decision is made. The values in the arg.prior represent the last break point passed in the current block of text. Similarly, arg.final contains the data for the final token that was processed before the current exit of the line-breaking algorithm. If a line-breaking decision has been made then the values in arg.prior contain the values for the end of the current line, and the values in arg.final are those to begin the next line.

The first field in the LineBreak.State record is the index. This is the index of the current token relative to the beginning of the encodedText. The micaLength and the pixelLength are the cumulative widths in micas and pixels, respectively, of the tokens allocated to the current line. Note that these are specifically not the cumulative widths of the tokens in the current text block. The next field is the count of the blanks encountered on the current line. After the blank count is a boolean called notPunctuation. This field indicates whether the last token was a punctuation mark or not. This field is used to determine the locations of legal break points in a line. The suffixChar is a code representing the last character on a line after a line-breaking decision is made. The possible values of suffixChar were previously defined in the enumerated type SuffixChar. The byteCount field is the total number of bytes in the tokens that have been allocated to the current line. The final field, whiteSpace, is the maximum amount of white space that the line-breaking algorithm can allocate to the line when making a line-breaking decision.

ArgHandle, ArgSpace, and argAlignment are three types that define data structures needed to align the ArgRec in memory in such a way as to avoid crossing a page boundary. This invariant is an optimization used by the micro-code implementation on the Xerox 6085 workstation. Since ArgRec is 23 words long, the record must start on a 32 word boundary to guarantee that it does not cross a page boundary. ArgSpace defines a block of memory 55 words long—which guarantees that there is a 32 word boundary in the range, with sufficient space after the boundary to contain the entire record. LineBreak.AlignArgRec is a procedure that takes as an argument a pointer to one of the 55 word blocks of memory, and returns a pointer to the 32 word boundary that is contained in the block.

LineBreak.SoftwareLineBreak and LineBreak.LineBreak define the Mesa and micro-code versions of the line-breaking algorithm that will be defined in the next section. The two procedures return the same results, the difference being that the latter is implemented as a custom machine instruction on the 6085. The argument to both of these procedures is a pointer to the ArgRec, and both return a LineBreak.Reason.

TABLE 6

```
DIRECTORY
    ESCAlphaExtras,
    Frame,
    LineBreak,
    PrincOps,
    TokenProps;
LineBreakImpl;          PROGRAM
                        IMPORTS Frame
                        EXPORTS LineBreak = BEGIN
nullData: LineBreak.State = [0,0,0,0,FALSE,null,0,0];
SoftwareLineBreak:      PUBLICPROCEDURE[arg: LineBreak.ArgHandle]
                        RETURNS [reason: LineBreak.Reason] = BEGIN
    props:              TokenPropsHandle;
    trailer:            TokenProps.TrailerHandle;
    margin:             NATURAL = arg.margin;
    thisBreak,pending:  LONG POINTER TO TokenProps.BreakPointData←NIL;
    width:              CARDINAL;
    breakNum:           CARDINAL←0;
    fit:                NATURAL←0;
    minWidth:           NATURAL;
    final, prior:       LONG PONITER TO LineBreak.State;
    aM:                 TokenProps.AtomMetrics;
    WholeWordBreak: PROCEDURE = INLINE{final↑←nullData; final.index←prior.index + 1};
    SaveThisBreak: PROCDEURE = INLINE{final.notPunctuation←FALSE; prior↑←final↑};
    ProcessSpace: PROCEDURE RETURNS[BOOLEAN] = INLINE BEGIN
```

TABLE 6-continued

```
        final.suffixChar←space;
        SaveThisBreak[ ];
        width←final.micaLength + arg.minSpaceMicaLength;
        IFwidth > margin THEN RETURN[TRUE];
        final ↑←[index:          final.index,
            micaLength:         width,
            pixelLength:        final.pixelLength + arg.minSpacePixelLength,
            count:              final.count + 1,
            notPunctuation:     FALSE,
            suffixChar:         space,
            byteCount:          final.byteCount + 1,
            whiteSpace:         final.whiteSpace + arg.whiteSpace];
        RETURN[FALSE];
END;
HyphenateWord: PROCEDURE = INLINE BEGIN
        IF final.notPunctuation THEN GOTO unableToBreakExit;
        IF props.breakPointCount = 0 OR NOT arg.hyphenate THEN GO TO noneFitsExit;
        --if the last full atom fits in the white space then don't hyphenate
        IF(margin - prior.whiteSpace) < = prior.micaLength THEN
            GO TO noneFitsExit;
        --pick the hyphenation point with highest desirability that fits in the
        --white space, otherwise pick the one with the tightest fit
        thisBreak←@props.breakPoint[0];
        minWidth←margin − final.whiteSpace;
        DO
            IF thisBreak.type = specialGermanCase THEN GOTO specialGermanExit;
            IF(width←final.micaLength + this break.micaLength) < = margin THEN
                {If thisBreak.type = hard THEN
                    {final.suffixChar←hardHyphen; GOTO successExit};
                IF width > = minWidth THEN
                    {final.suffixChar←hyphen; GOTO successExit};
                IF width > fit THEN {fit←width; pending←thisBreak}};
            IF(breakNum←breakNum + 1) = props.breakPointCountTHEN
                {IF fit = 0 THEN GOTO noneFitsExit;
                thisBreak←pending;
                width←fit;
                final.suffixChar←hyphen;
                GOTO successExit};
            thisBreak←thisBreak + SIZE[TokenProps.BreakPointData];
        ENDLOOP;
        EXITS
            successExit = >
                --add the sylable to the current position and make it the break point
                {final.micaLength←width;
                final.pixelLength→final.pixelLength + thisBreak.pixelLength;
                final.byteCount←final.byteCount + thisBreak.byteCount;
                SaveThisBreak[ ];
                --now compute the backup to start the next line
                final↑←(IF final.suffixChar = hardHyphen THEN
                    [index:          final.index,
                    micaLength:      -thisBreak.micaLength,
                    pixelLength:     -thisBreak.pixelLength,
                    count:           0,
                    notPunctuation:  FALSE,
                    suffixChar:      null,
                    byteCount:       -thisBreak.byteCount,
                    whiteSpace:      0] ELSE
                    [index:          final.index,
                    micaLength:      -(thisBreak.micaLength - arg.hyphenMicaLength),
                    pixelLength:     -(thisBreak.pixelLength - arg.hyphenPixelLength),
                    count:           0,
                    notPunctuation:  FALSE,
                    suffixChar:      null,
                    byteCount:       -thisBreak.byteCount,
                    whiteSpace:      0])};
            noneFitsExit = >              WholeWorldBreak[ ];
            unableToBreakExit = >         reason←unableToBreak;
            specialGermanExit = >         reason←specialGermanCase;
        END
        --MAIN LOOP OF LineBreak
        final←@arg.final;prior←@arg.prior;
        UNTIL final.index > = arg.text.LENGTH DO
            WITH x; arg.text[final.index]SELECT FROM
                token = >
                    {aM←(props←@arg.propsBase[x.offset]).atomMetrics;
                    IF props.font # arg.font THEN GOTO invalidPropsExit;
                    IF margin < = (width←final.micaLength + aM.micaLength)THEN GO TO marginExit;
                    IF final.notPunctuation AND props.notPunctuation THEN GOTO contiguousExit;
                    final.notPunctuation←props.notPunctuation;
```

TABLE 6-continued

```
        final.micaLength←width;
        final.pixelLength←finalpixelLength + aM.pixelLength;
        final.byteCount←final.byteCount + aM.byteCount;
        IF x.spaceFollows THEN IF ProcessSpace [ ] THEN GO TO simpleMarginExit};
    escape = >
        SELECT x.escapeType FROM
            space = >        IF ProcessSpace [ ] THEN GO TO simpleMarginExit;
            zeroWidthSpace = > {final.suffixChar←zeroWidthSpace;SaveThisBreak[ ]};
            changeBase = > GO TO changeBaseExit;
            ENDCASE;
    ENDCASE;
    final.index←final.index + 1;
    REPEAT
        simpleMarginExit = > {reason←margin; WholeWordBreak[ ]};
        changeBaseexit = > reason←changeBase;
        invalidPropsExit = > reason←invalidProps;
        marginExit = > {reason←margin;HyphenateWord[]};
        contiguousExit = > reason←contiguousWords;
        FINISHED = > reason←normal;
    ENDLOOP;
END;
```

Table 6 is the contents of the file LineBreakImpl.mesa. This file supplies the implementation of the interface Line-Break. The list of names in the DIRECTORY section of the file declares the names of interface files that are referenced in LineBreakImpl. In the next source statement, LineBreak-Impl is declared as a program (rather than a definitions file as before) which uses (IMPORTS) a subprogram from the interface Frame, and shares (EXPORTS) a program via the interface LineBreak. A constant nullData is declared immediately after the PROGRAM statement.

THE LINEBREAKING ALGORITHM

SoftwareLineBreak computes line endings based on the margin stored in the argument arg. The program is designed to handle cases that require more than one block of text in the same line. The design is also independent of the method that the application using the program uses to store the text. The main procedure is organized to include four nested subprograms.

WholeWordBreak is the logic that is used when a line-ending decision is made at the end of a whole word or at a space. WholeWordBreak initializes data in arg.final to refer to the beginning of the token after the one that ends the current line. This procedure is declared as an INLINE procedure to indicate that it is to be treated as a macro, which implies better performance for short procedures.

SaveThisBreak is a procedure that transfers the contents of arg.final into arg.prior. The logic may need to revert back to the values in arg.prior if the next token can not be added to the current line. This procedure is also declared to be an INLINE for the sake of performance.

ProcessSpace checks to see if the current space will fit on the line. If not, then processing is terminated and the routine returns a TRUE value. If the current space fits, then the data in arg.final is modified to reflect the values at the current point. In this case, the routine returns a value of FALSE. ProcessSpace is also treated as a macro to optimize performance.

HyphenateWord is the subprocedure that is executed when the margin is crossed by a token. The algorithm branches to the unableToBreak exit clause if the last token that was processed was not a punctuation character. This exit results in the reason being set to unableToBreak. In this context a space is considered as a punctuation character. Similarly, if there are no break points to choose from or if hyphenation is not selected for the current block of text, then the algorithm exits through a branch to the noneFitsExit clause. If this path is executed, then the last token processed is selected as the break point, and the values of final are initialized with the procedure WholeWordBreak.

At this point the algorithm has determined that hyphenation points exist and that it is appropriate to try to select one of the break points. Before entering the main loop two variables are initialized. The first is a pointer to an element of the break-point array. This variable is initialized to point to the first element of the break-point array in the token being broken. The second variable is the minimum width that the text including the portion of the final token must be to satisfy the white space constraint.

The main loop in HyphenateWord selects the best possible break point from the break points in the list. The algorithm requires that the break points be sorted on two keys: first in decending order of priority (in otherwords the most desirable breaks come first) and within each class of priority, decreasing order of position in the token. This ordering allows the algorithm to detect the optimal break point with a single pass over the break points. The optimal break point is the one with the highest priority and that results in the tightest fit for the line.

Three exceptions cause the algorithm not to select the break point based on the highest priority and tightest fit criteria. The first exception is for a special case break point such as a German word that would require respelling if the break point is selected. The second exception is if there is a manually inserted or "hard" hyphen. In that case the manually inserted hyphen is chosen whether or not it gives the best fit. The third exception is if all of the break points are too large—that is none result in at least the minimum whitespace—then the algorithm terminates without selecting a break point and the boundary of the previous token is used for the termination of the line.

If a suitable break point is selected, HyphenateWord exits through the successExit clause. The first four statements of the clause update arg.final and arg.prior fields, respectively, to reflect the break point that has been selected. Next, arg.final is updated to represent the part of the token beginning the next line. The manner in which arg.final is updated depends on the type of the selected hyphenation point. If the break point is a synthetic hyphen generated by the break-point logic, the break-point metrics must be adjusted since the hyphen is not actually part of the token. The most common hyphens that are not synthetic are hard hyphens.

When any form of hyphen is chosen to terminate a line, micaLength, pixelLength, and byteCount are all assigned negative numbers representing the portion of the token ending the previous line. The value of index remains unchanged so the same token begins the next line. When the negative values in arg.final are added to the values for the entire token, the results are the proper values for the portion of the token beginning the new line.

The main part of SoftwareLineBreak begins with the initialization of pointers to arg.final and arg.prior. The main loop is executed as long as arg.final.index is less than or equal to the length of the current text block, arg.text. The processing that is done on each token entry in arg.text depends on the type of the token entry.

If the type is a token entry, then the first statement in the token branch of the variant select statement dereferences several of the levels of indirection to speed processing. Next, the font that is desired for this text block is compared to the font that was last used to compute the atom metrics. If the font is incorrect then the main loop exits through the invalidProps clause which in turn causes a return from the procedure with a reason of invalidProps. This gives the caller an opportunity to recompute the token properties and restart the procedure. If the properties are still valid then the computation is made to determine whether the entire token fits on the current line. If it does not then the loop exits through the marginExit clause, and hyphenation is attempted. If the token fits, then a check is made as to whether the algorithm has encountered two consecutive tokens without either a space or a punctuation mark. If so then the loop is exited through the contiguousExit clause.

At this point it has been determined that the current token fits on the line and that it can be added to the line. The next four lines of the main loop update arg.final to reflect this. The final statement in the clause checks whether the space-Follows Boolean is TRUE for this token. If it is then the ProcessSpace subprocedure is executed. If the space does not fit on the line, then the main loop is exited through the simpleMarginExit since it is clear that hyphenation is not needed. If the space fits, then the token branch of the select statement is exited, final.index is incremented, and the next entry in the text block is processed.

The other branch of the variant select statement in the main loop is executed if the text entry is an escape variant of the Token.Entry record. As was described in Table 1, the escape variant is itself a variant record (refered to as an anonymous record in Mesa). Therefore, the escape arm of the select statement is also a select statement. As mentioned previously, the three variants of this record are space, zeroWidthSpace, and changeBase.

Processing for the space variant consists of executing the ProcessSpace subroutine. If the space does not fit on the line then the main loop is exited through the simpleMarginExit clause. When a zeroWidthSpace is encountered the final-.suffixChar is updated to reflect this. The current position on the line is made a viable break point in case the next token does not fit. A changeBase escape causes an exit from the main loop through the changeBase exit clause. No other processing is needed, since the caller updates all of the necessary data structures including arg.propsBase. If the processing on the escape entry is completed without an exit being executed, then the clause is exited, final.index is incremented and the processing of the next text entry is begun.

If the entire text block is processed without making a line-ending decision, then the procedure exits through the FINISHED exit clause of the main loop.

TABLE 8

| | |
|---|---|
| arg = | [text:DESCRIPTOR[11570000B↑,134] (134) [. . .], |
| | propsBase:11421400B↑, hyphenate:TRUE, font:0, margin:8996, |
| | hyphenPixelLength:3, minSpacePixelLength:2, hyphenMicaLength:118, |
| | minSpaceMicaLength:128, whiteSpace:128, |
| | final:[index:0, micaLength:0, pixelLength:0, count:0, |
| |     notPunctuation:FALSE, suffixChar:null, |
| |     byteCount:0, whiteSpace:0], |
| | prior:[index:0, micaLength:0, pixelLength:0, count:0, |
| |     notPunctuation:FALSE, suffixChar:null, byteCount:0, |
| |     whiteSpace:0]] |
| arg = | [text:DESCRIPTOR[11570000B↑,134] (134) [. . .], |
| | propsBase:11421400B↑, hyphenate:TRUE, font:0, margin:8996, |
| | hyphenPixelLentgh:3, minSpacePixelLength:2, hyphenMicaLength:118, |
| | minSpaceMicaLength:128, whiteSpace:128, |
| | final:[index:10, micaLength:−745, pixelLength:−21, count:0, |
| |     notPunctuation:FALSE, suffixChar:null, byteCount:−4, |
| |     whiteSpace:0], |
| | prior:[index:10, micaLength:8796, pixelLength:233, count:9, |
| |     notPunctuation:FALSE, suffixChar:hyphen, byteCount:51, |
| |     whiteSpace:1152]] |
| arg = | [text:DESCRIPTOR[11570000B↑,134] (134) [. . .], |
| | propsBase:11421400B↑, hyphenate:TRUE, font:0, margin:9878, |
| | hyphenPixelLength:3, minSpacePixelLength:2, hyphenMicaLength:118, |
| | minSpaceMicaLength:128, whiteSpace:128, |
| | final:[index:22, micaLength:0, pixelLength:0, count:0, |
| |     notPunctuation:FALSE, suffixChar:null, byteCount:0, |
| |     whiteSpace:0], |
| | prior:[index:21, micaLength:9426, pixelLength:249, count:9, |
| |     notPunctuation:FALSE, suffixChar:space, byteCount:54, |
| |     whiteSpace:1152]] |
| arg = | [text:DESCRIPTOR[11570000B↑,134] (134) [. . .], |
| | propsBase:11421400B↑, hyphenate:TRUE, font:0, margin:9878, |
| | hyphenPixelLength:3, minSpacePixelLength:2, hyphenMicaLength:118, |

TABLE 8-continued

```
    minSpaceMicaLengh:128, whiteSpace:128,
  final:[index:32, micaLength:0, pixelLength:0, count:0,
          notPunctuation:FALSE, suffixChar:null, byteCount:0,
          whiteSpace:0],
  prior:[index:31, micaLength:9838, pixelLength:265, count:7,
          notPunctuation:FALSE, suffixChar:space, byteCount:57,
          whiteSpace:896]],
```

Table 8 shows the values in the argRec prior to beginning processing of the text in Table 4, and then after each of the first three lines that were computed. In the first instance the value for text is the descriptor that represents the encoding in Table 2. The values have been deleted for the sake of brevity. The values for font, margin, hyphenPixelLenght, minSpacePixelLength, hyphenMicaLength, minSpaceMicalLength and whiteSpace are all set for a 10 point serif font. The values of final and prior are all set to initial null values since no tokens have been processed.

The second value of arg in Table 8 corresponds to the values in arg after the first line has been computed. Only the values in final and prior have changed. The final.index and the prior.index are the same, since the last token on the first line was hyphenated. Notice that in Table 2 the tenth entry (starting with the first element as number zero) corresponds to the token "document". The values in arg.prior correspond to the accumulation of the first ten tokens plus the portion of the eleventh token through "docu". The negative numbers in arg.final correspond only to the portion of the last token included in the values of arg.prior. When these values are added to the first token of the next line (which will be the values for the entire word "document") the result is that the proper part of the word, "ment", is added to the line values. This is shown graphically in FIG. 4. By processing the same token twice when the line-breaking decision requires splitting a token across two lines, the code that calls Software-LineBreak can be written with logic that is largely independent of whether hyphenation has occurred. This invariance results in very efficient pagination code.

After the second line is computed, the values in arg will be those in the third value of arg in Table 8. Notice that in this block the value of margin changed to reflect that the second line was not to be indented. Since the second line is not hyphenated, the values for arg.final.index and arg.prior.index are different. This is appropriate since the second line ends on entry 21 which is the token "each", but the third line begins with entry 22 "unique". Since the final token of the second line is not hyphenated, there are no carryover values from line to line as there is with the first line. Therefore, all of the other values of arg.final at this point are null.

The final value of arg in Table 8 corresponds to the third line of Table 4. This line started with a complete token and ended with a complete token.

TABLE 7

```
/* MESA TO C TYPE EQUIVALENCES     */
typedef unsigned short int CARDINAL;
typedef unsigned short int UNSPECIFIED;
typedef unsigned long int LCARDINAL;
typedef short int                   INTEGER;
typedef long int                    LINTEGER;
typedef char                        CHARACTER;
#define NATURAL(_N)                 unsigned int_N : 15
#define BOOLEAN(_N)                 unsigned int_N : 1
#define TRUE             1
#define FALSE            0
#define NIL              0
#define NULL             0
/* TYPES USED IN WORDCACHE MESA MODULE */
typedef unsigned char               BREAKTYPE;
#define     BRK_HARD        0
#define     BRK_DISCRET     1
#define     BRK_BEST        2
#define     BRK_BETTER      3
#define     BRK_GOOD        4
#define     BRK_OK          5
#define     BRK_GERMAN      255
#define OFFSET(_N)                  unsigned int _N :14
typedef struct
    {
        CARDINAL    micalength;
        CARDINAL    pixellength;
        CARDINAL    bytecount;
    }           ATOM_METRICS;
typedef struct
    {
        BREAKTYPE       type;
        unsigned char   bytecount;
        CARDINAL        micalength;
        CARDINAL;       pixellength;
    }               BREAKPOINT;
typedef struct
```

TABLE 7-continued

```
{
    BOOLEAN(        notpunctuation );
    NATURAL(        font );
    WORD_METRICS    wordmetrics;
    CARDINAL        sylablecount;
    SYLABLE         sylable[ ];
}               OBJECT;
/* TYPES USED IN LINEBREAK MESA MODULE */
typedef int REASON;
#define     REA_MARGIN 0
#define     REA_NORMAL 1
#define     REA_CHANGEBASE 2
#define     REA_INVALCACHE 3
#define     REA_CONTWORDS 4
#define     REA_CANTBREAK 5
#define     REA_GERMAN 6
#define     ENTRYTYPE(_N)       unsigned int _N :1
#define     ENT_WORD 0
#define     ENT_ESCAPE 1
#define     ESCAPETYPE(_N)      unsigned int _N :2
#define     ESC_SPACE 0
#define     ESC_ZERWIDSPACE     1
#define     ESC_CHANGEBASE 2
#define     SUFFIXCHAR(_N)      unsigned int _N :3
#define     SUF_SPACE 0
#define     SUF_ZERWIDSPACE     1
#define     SUF_HYPHEN 2
#define     SUF_HARDHYPHEN 3
#define     SUF_NULL 4
typedef union
    {
        struct
            {
            ENTRYTYPE(      entrytype );
            BOOLEAN(        spacefollows );
            OFFSET(         offset );
            } token;
        struct
            {
            ENTRYTYPE(      entrytype );
            ESCAPETYPE(     type );
            unsigned int newbase :13;
            } escape;
    }           ENTRY;
typedef struct
    {
        ENTRY =         base;
        CARDINAL        length;
    }           ENTRYDSC;
typedef struct
    {
        CARDINAL        index;
        INTEGER         micalength;
        INTEGER         pixellength;
        unsigned int    count : 12;
        BOOLEAN(        notpunctuation );
        SUFFIXCHAR(     suffixchar );
        INTEGER         bytecount;
        CARDINAL        whitespace;
    }           STATE;
typedef struct
    {
        ENTRYDSC        text;
        unsigned char = cache;
        BOOLEAN(        hyphenate );
        NATURAL(        font );
        CARDINAL        margin;
        unsigned char   hyphenpixellength;
        unsigned char   minspacepixellength;
        CARDINAL        hyphenmicalength:
        CARDINAL        minspacemicalength;
        CARDINAL        whitespace;
        STATE           final;
        STATE           prior;
    }           ARGREC;
/* LINEBREAKIMPL - THIS ROUTINE IMPLEMENTS LINEBREAKIMPL.MESA IN C */
    #define WHOLEWORDBREAK                                      \
        {   final->index = prior->index + 1;                    \
            final->micalength =         0;                      \
```

TABLE 7-continued

```
                final->pixellength =         0;              \
                final->count =               0;              \
                final->notpunctuation =      FALSE;          \
                final->suffixchar =          SUF_NULL;       \
                final->bytecount =           0;              \
                final->whitespace =          0; }
#define SAVETHISBREAK                                        \
    {   final->notpunctuation = FALSE;                       \
        *prior = *final; }
#define PROCESSSPACE(_B)                                     \
    {   final->suffixchar = SUF_SPACE;                       \
        SAVETHISBREAK;                                       \
        width = final->micalength + arg->minspacemicalength; \
        if( width > margin )                                 \
            (_B) = TRUE;                                     \
        else                                                 \
            {   final->micalength = width;                   \
                final->pixellength += arg->minspacepixellength; \
                final->count += 1;                           \
                final->notpunctuation = FALSE;               \
                final->bytecount += 1;                       \
                final->whitespace += arg->whitespace;        \
                (_B) = FALSE; } }
REASON LINEBREAKIMPL( arg )
register ARGREC * arg;
{
        OBJECT *            word;
        CARDINAL            margin = arg->margin;
        SYLABLE *           thisbreakpoint = NULL;
        SYLABLE *           pending = NULL;
        CARDINAL            width;
        CARDINAL            breaknum = 0;
        CARDINAL            fit = 0;
        CARDINAL            minwidth;
        STATE *             final = &arg->final;
        STATE *             prior = &arg->prior;
        ATOM_METRICS *      am;
        ENTRY *             x = &(arg->text.base[final->index]);
        CARDINAL            bool;
            for ( ; final->index < arg->text.length ; final->index++, x++ )
                {
                if ( x ->token.entrytype == ENT_TOKEN )
                    {
                    props = (OBJECT *)(arg->cache + x->token.offset);
                    am = &props->atommetrics;
                    if( props->font != arg->font )
                        return( REA_INVALCACHE );
                    width = final->micalength + am->micalength;
                    if( margin <= width )
                        {
                        /* HYPHENATE WORD        */
                        if( final->notpunctuation )
                            return( REA_CANTBREAK );
                        if( props->breakpointcount == 0 || ! arg->hyphenate )
                            {
                            WHOLEWORDBREAK;
                            return( REA_MARGIN );
                            }
                        }
                        /* IF THE LAST FULL WORD FITS IN THE WHITE-
                           SPACE THEN DON'T HYPHENATE       */
                        if( (margin - prior->whitespace) <= prior->micalength )
                            {
                            WHOLEWORDBREAK;
                            return( REA_MARGIN );
                            }
    /*  PICK THE BREAK POINT WITH THE HIGHEST
        DESIRABILITY THAT FITS IN THE WHITE SPACE,
        OTHERWISE PICK THE ONE WITH THE TIGHTEST
        FIT         */
minwidth = margin- final->whitespace;
for( thisbreakpoint = &(props->breakpoint[0]) ;; thisbreakpoint++
)
    {
    if( thisbreakpoint->type == BRK_GERMAN )
        return( REA_GERMAN );
    if((width=final->micalength+thisbreakpoint->micalength<=margin)
            {
            if( thisbreakpoint->type == BRK_HARD )
```

TABLE 7-continued

```
                {
                final->suffixchar = SUF_HARDHYPHEN;
                break;
                }
        if( width >= minwidth )
                {
                final->suffixchar = SUF_HYPHEN;
                break;
                }
        if( width > fit
                {
                fit = width;
                pending = thisbreakpoint;
                }
            }
    if( ++breaknum == props->breakpointcount )
        {
        if( fit == 0 )
            {
            WHOLEWORDBREAK;
            return( REA_MARGIN );
            }
        thisbreakpont = pending;
        width = fit;
        final->suffixchar = SUF_HYPHEN;
        break;
        }
    }
        /* ADD THE BREAKPOINT TO THE CURRENT POSITION AND/
            MAKE IT THE BREAK POINT    */
        final->micalength = width;
        final->pixellength += thisbreakpoint->pixellength;
        final->bytecount += thisbreakpoint->bytecount;
        SAVETHISBREAK;
        /* NOW COMPUTE THE BACKUP TO START THE
            NEXT LINE      */
        if( final->suffixchar == SUF_HARDHYPHEN )
                {
                final->micalength = (-thisbreakpoint->micalength);
                final->pixellength = (-this breakpoint->pixellength);
                }
        else
                {
                final->micalength =
                    (-(thisbreakpoint->micalength-arg->hyphenmicalength));
                final->pixellength =
                    (-(thisbreakpoint->pixellength-arg->hyphenpixellength));
                }
        final->count = 0;
        final->notpunctuation = FALSE;
        final->suffixchar = SUF_NULL;
        final->bytecount = (-thisbreakpoint->bytecount);
        final->whitespace = 0;
        return( REA_MARGIN );
        }
    if( final->notpunctuation && props->notpunctuation )
        return( REA_CONTWORDS );
final->notpunctuation           = props->notpunctuation;
final->micalength               = width;
final->pixellength              += am->pixellength;
final->bytecount                += am->bytecount;
        if( x->token.spacefollows )
            {
            PROCESSSPACE( bool );
            if( bool )
                {
                WHOLEWORDBREAK;
                return( REA_MARGIN );
                }
            }
        }
else
if( x->token.entrytype == ENT_ESCAPE )
    {
    if( x->escape.type == ESC_SPACE )
        {
        PROCESSSPACE( bool );
        if( bool )
            {
```

TABLE 7-continued

```
                WHOLEWORDBREAK;
                return( REA_MARGIN );
                }
            }
        if( x->escape.type == ESC_CHANGEBASE )
            return ( REA_CHANGEBASE );
        if( x->escape.type == ESC_ZERWIDSPACE )
            {
            final->suffixchar = SUF_ZERWIDSPACE;
            SAVETHISBREAK;
            }
        }
    }
    return( REA_NORMAL );
};
```

Table 7 is the equivalent of the program in Table 1, Table 3, Table 5 and Table 6, written in the C programming language. This program will run on any computer that provides a C compiler, including any member of the Sun Micro Systems 3 and 4 family of minicomputers, such as the model 3/50. This code has also been run on the DEC Vax 7xx family and microVax computers.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. An iterative method of encoding and line breaking text comprising a string of atoms being received by a memory, each atom comprising one or more character codes, said string of atoms at any one point in time comprising a plurality of previous atoms, a current atom and a next atom, said string of atoms comprising words which comprise strings of characters, numerals, punctuation marks and spaces, into a list of tokens and a corresponding array of data blocks stored in said memory, said method comprising the steps of     initializing the memory by starting with a list of zero tokens and zero data blocks and proceeding to create the entire list and array solely with iterations of the method, each iteration comprising the steps of:

determining whether the current atom in said string of atoms is identical to a previous atom in said string,         if so, adding an additional token equal to the token of said previous identical atom to the end of said list of tokens in said memory, and proceeding to the determining step for the next atom,         if not, adding a new and unique token to the end of said list of tokens in said memory, creating an additional data block in said memory corresponding to said new token comprising the string of characters in said current atom and the width of said current atom, and proceeding to the determining step for the next atom, and     further comprising breaking said string of atoms into a sequence of lines of a predetermined length suitable for printing on a printer comprising a current line which is being broken, a next line and previous lines, said method further comprising the steps of:

using the token of the current atom to access the corresponding data block,         adding the width in the data block of the current atom to a running sum of atom widths on the current line to determine a total width of all atoms of the current line,         if the sum of atom widths is not greater than a predetermined value, proceeding to the token of the next atom, and         if the sum of widths is greater than said predetermined value, breaking the line at the end of the current atom and proceeding to the next line.

2. The method of claim 1 further comprising breaking said string of atoms into a sequence of lines of a predetermined length suitable for printing on a printer comprising a current line which is being broken, a next line and previous lines, comprising the steps of:

A. using the method of claim 1 to generate said list of tokens and array of data blocks,     B. using the token of the current atom to access the corresponding data block,     C. adding the width, in the data block, of the current atom to a running sum of widths on the current line to determine a total width of all atoms on the current line,     D if the total width is greater than said predetermined length, then,         a. if the previous atom was a space, breaking the current line after the previous atom, otherwise,         b. breaking the current line after the last atom on the current line that was followed by a space, and     E. if said total width is not greater than said predetermined value, proceeding to the next atom, and     F. sending said sequence of lines to said printer.

3. The method of claim 1 wherein said characters have style, size, weight, stress and capitalization, further comprising the step of defining two atoms as identical when they have the same characters, style, size, weight, stress and capitalization.

4. The method of claim 1 wherein each word of more than one syllable is separated into partial words comprising one or more beginning partial words and one or more ending partial words of predetermined widths separated by hyphenation points further comprising, for each data block that corresponds to a word, the step of adding the hyphenation points of said word and the widths of each partial word to said data block.

5. The method of claim 4 further comprising breaking said string of atoms into a sequence of lines of a predetermined length suitable for printing on a printer comprising a current line which is being broken, a next line and previous lines, said method further comprising the steps of:

using the token of the current atom to access the corresponding data block,     adding the width in the data block of the current atom to a running sum of atom widths on the current line to determine a total width of all atoms of the current line,     if the sum of atom widths is not greater than a predetermined value, proceeding to the token of the next atom, if the sum of widths is greater than said predetermined value by an amount less than a predetermined amount, breaking the line at the end of the current atom and proceeding to the next line, if the sum of widths exceeds the predetermined value by said predetermined amount, and if the current atom is a hyphenated word, dividing said hyphenated word at a hyphenation point, adding the beginning partial word or words of the hyphenated word to the end of the current line, and starting the next line with the ending partial word or words of the current word.

\* \* \* \* \*